No. 684,099. Patented Oct. 8, 1901.
P. RICHEMOND.
VALVE.
(Application filed June 21, 1901.)
(No Model.)
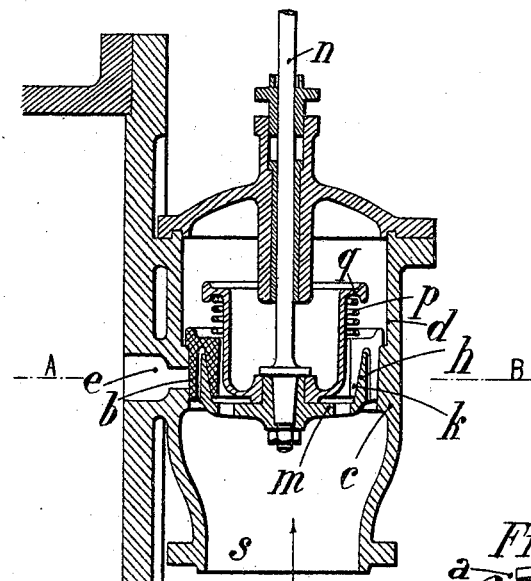
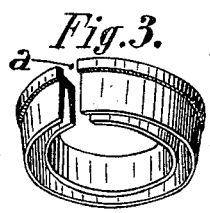
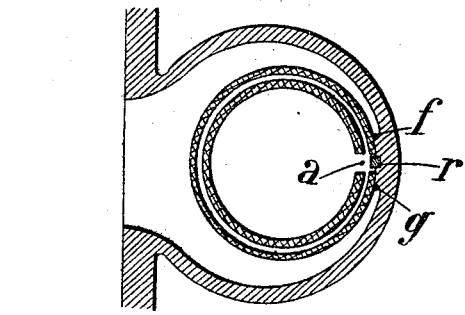
Witnesses:
Inventor
Pierre Richemond
By
James L. Norris.
Atty

UNITED STATES PATENT OFFICE.

PIERRE RICHEMOND, OF PANTIN, FRANCE, ASSIGNOR TO THE SOCIÉTÉ ANONYME DES ETABLISSEMENTS WEYHER ET RICHEMOND, OF SAME PLACE.

VALVE.

SPECIFICATION forming part of Letters Patent No. 684,099, dated October 8, 1901.

Application filed June 21, 1901. Serial No. 65,486. (No model.)

*To all whom it may concern:*

Be it known that I, PIERRE RICHEMOND, engineer, a citizen of the French Republic, residing at Pantin, department of Seine, France, (having post-office address 50 Rue d'Aubervilliers, in the said city,) have invented certain new and useful Improvements in Valves, of which the following is a specification.

This invention has for its object to provide a new valve which is intended to effect without friction the distribution of the motive fluid in steam, petroleum, or other fluid engines. This valve, which may also be used as a simple cock or a valve, is a metallic ring having a U-shaped cross-section. Its external surface is slightly tapered and the whole is made elastic, being opened along a straight line by a split, so that it is possible to disengage the said valve or cock out of its seat without friction.

In order that my invention may be clearly understood, I will describe it with reference to the accompanying drawings, in which—

Figure 1 is a vertical section through the axis of the valve. Fig. 2 is a horizontal section through the line A B of Fig. 1. Fig. 3 is a perspective view of the valve.

In this present example the valve is supposed to be applied to a steam-engine.

As shown in Fig. 3, this valve is made in the form of a metallic ring, the cross-section of which is U-shaped, and this ring is made elastic by the presence of a split $a$ of suitable width. The outer surface $b$ of the valve is slightly tapered and fits on its seat formed by an annular ridge $c$, formed with the steam-box $d$, or the ridge $c$ may be in the form of an annulus, suitably fitted into this box. Through the ridge extends the steam-inlet $e$, which extends around the ridge and is divided into two parts by the projection $g$, the purpose of which is to enable the fixation of the pin $r$.

The internal surface $h$ of the valve is also tapered, and on this part is fitted the correspondingly-tapered surface $k$ of an annular body $m$, to which a reciprocating longitudinal motion is imparted by means of a stem $n$, operated by an eccentric or other suitable gear with or without tripping-gear, as in the ordinary engines or those provided with drop-valves. The stroke of the aforesaid stem $n$ is so adjusted that it continues to move a little farther—say to the left—when the valve has come in contact with its seat. A spring $p$, bearing on one side on the valve and on the other side on the cup $q$, connecting with the annular body $m$, prevents the valve sticking or lagging behind in consequence of its inertia and meantime helps to apply it on its seat. To the projection $g$ is secured a vertically-extending pin $r$, which projects inwardly and is adapted to be arranged in the split $a$ of the valve. Pin $r$ prevents the valve from turning—that is, it resists the movement of the valve by engaging the edges of the split.

The working of the valve acting as a steam-feeder is the following: The admission of steam into the cylinder takes place through the passage $e$, when the annular body $m$ will be drawn up by the stem $n$. Its tapered part $k$ then engaging with the correspondingly-tapered surface $h$ of the valve reduces very slightly the diameter of the valve, this readily taking place on account of its elasticity. The valve is so lifted off from its seat that it is moved away without resistance or friction by the bell-shaped part $m$, which is in engagement with the internal conical part of the annular body. The steam-port $e$ is thus opened to admission. While the said bell-shaped part $m$ is moved back by the stem-gear $n$, the valve remains in engagement with the bell-shaped part $m$ and keeps its slightly-decreased diameter. It then returns to its seat $c$ without friction, and as the bell-shaped part $m$ continues to move a little farther to the left the valve disengages therefrom and presses against its seat by the pressure of the steam, and thus securely closes the port.

When the valve has to be used as an exhaust-valve instead of an admission-valve, as described, the parts are reversed—that is to say, the valve-chamber communicates with the cylinder by its part containing the arrow $s$, while the passage $e$ is in communication with the atmosphere or the condenser, as the case may be.

The advantages of this valve are the following: It is of very reduced weight and of a simple and cheap manufacture. It is adapted for high pressures, as it is balanced and subject to no pressure as soon as it is lifted off its seat. It is suitable for high-speed engines on account of its lightness, its small inertia, and absence of friction, and permits the gear required for its actuation being simplified. It permits the employment of superheated steam, as it works without friction. It is perfectly steam-tight and reduces clearance to a minimum, since it permits of utilizing the whole periphery of the port without it being necessary to use the bridging-bars that are necessary in the case of piston or cylindrical valves.

Having now particularly described and ascertained the object of the said invention and in what manner the same is to be performed, I declare that what I claim is—

A valve, which may be used as an induction or eduction valve for steam or other fluid engines or as a simple cock or valve consisting of a metallic ring having a U-shaped cross-section and a split $a$ and a conical part $h$ in which engages at the beginning of the admission stroke the correspondingly-shaped internal surface $k$ of a body $m$, so that the valve which is made elastic by the presence of its split, decreases in diameter and leaves its seat without friction, substantially as set forth.

In testimony whereof I have hereunto set my hand in presence of two subscribing witnesses.

PIERRE RICHEMOND.

Witnesses:
HENRY SCHWAB,
EDWARD P. MACLEAN.